US006785632B1

(12) United States Patent
Goker

(10) Patent No.: US 6,785,632 B1
(45) Date of Patent: Aug. 31, 2004

(54) REAL TIME STATISTICAL COMPUTATION IN EMBEDDED SYSTEMS

(75) Inventor: Turguy Goker, Solana Beach, CA (US)

(73) Assignee: Seagate Removable Solutions LLC, Scotts Valley, CA (US)

( * ) Notice: Subject to any disclaimer, the term of this patent is extended or adjusted under 35 U.S.C. 154(b) by 202 days.

(21) Appl. No.: 10/080,696

(22) Filed: Feb. 25, 2002

Related U.S. Application Data

(60) Provisional application No. 60/283,779, filed on Apr. 12, 2001.

(51) Int. Cl.$^7$ .......................... G06F 15/00; G05B 13/02
(52) U.S. Cl. ....................................... 702/179; 700/51
(58) Field of Search .......................... 702/179; 700/51, 700/108; 703/2

(56) References Cited

U.S. PATENT DOCUMENTS

| | | | |
|---|---|---|---|
| 5,949,678 A | | 9/1999 | Wold et al. |
| 5,956,251 A | | 9/1999 | Atkinson et al. |
| 5,987,398 A | * | 11/1999 | Halverson et al. .......... 702/179 |
| 6,017,143 A | | 1/2000 | Eryurek et al. |
| 6,269,326 B1 | | 7/2001 | Lejeune et al. |
| 6,272,480 B1 | | 8/2001 | Tresp et al. |
| 6,285,971 B1 | | 9/2001 | Shah et al. |
| 6,401,054 B1 | * | 6/2002 | Andersen ..................... 702/179 |
| 6,477,432 B1 | * | 11/2002 | Chen et al. ................... 700/51 |
| 6,539,267 B1 | * | 3/2003 | Eryurek et al. ............... 700/51 |
| 6,556,884 B1 | * | 4/2003 | Miller et al. ................ 700/121 |

OTHER PUBLICATIONS

"Multivariate Statistical Process Control and Signature Analysis Using Eigenfactor Detection Methods", Chen et al., the 33$^{rd}$ Symposium on the interface of Computer Science and Statistics, Jun. 2001.*
"A Statistical Methods of Single and Multiple Response Surface Modeling", Smith et al., IEEE Transactions on Semiconductor Manufacturing, vol. 12, No. 4, Nov. 1999.*
"Statistical Methods for Semiconductor Manufacturing", Boning et al., Encyclopedia of Electrical Engineering, Feb. 1999.*
"Handbook of Statistical Methods for Engineers and Scientists", Wadsworth, Jr., McGraw–Hill, Inc., 1990.*
"Multivariate Statistical Process Control and Signature Analysis Using Eigenfactor Detection Methods", Chen et al., the 33$^{rd}$ Symposium on the Interface of Computer Science and Statistics, Jun. 2001.*
"A Statistical Methods of Single and Multiple Response Surface Modeling", Smith et al., IEEE Transactions on Semiconductor Manufacturing, vol. 12, No. 4, Nov. 1999.*
"Statistical Methods for Semiconductor Manufacturing", Boning et al., Encyclopedia of Electrical Engineering, Feb. 1999.*
"Handbook of Statistical Methods for Engineers and Scientists", Wadsworth, Jr., McGraw–Hill, Inc., 1990.*

* cited by examiner

Primary Examiner—John Barrow
Assistant Examiner—Toan M. Le
(74) Attorney, Agent, or Firm—McDermott Will & Emery LLP

(57) ABSTRACT

An effective technique for computing a statistical performance measure based on a samples of measured parameter values utilizes a one-time computation based on accumulations of the sum of the sample values and the sum of the squares of the sample values. The preferred embodiment computes variance and/or standard deviation, which can be used to compute other useful performance statistics. Using the accumulated sums, instead of the actual sample values, eliminates the need to store all of the samples until after sampling and the subsequent calculation of the desired performance metrics. The one-time calculation is relatively simple and fast. Because of the reduced data storage requirement and the relatively simple calculation, it is possible to imbed the desired calculation functions in a manufactured device as an automated self-analysis tool, for example, as a function of the processor of a disk drive or a tape drive.

18 Claims, 3 Drawing Sheets

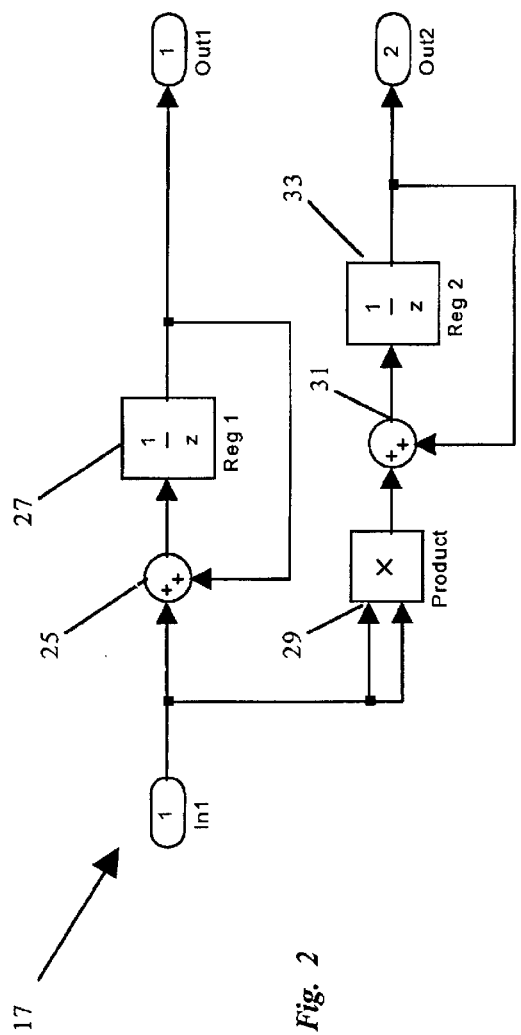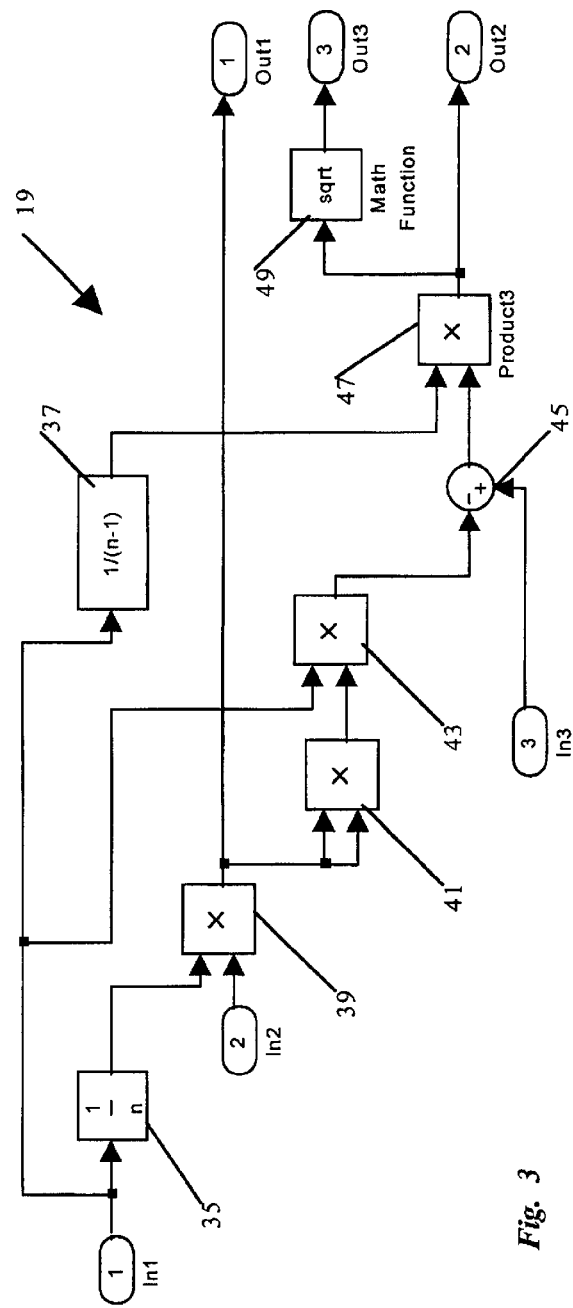

REAL TIME STATISTICAL COMPUTATION IN EMBEDDED SYSTEMS

RELATED APPLICATION

This application claims the benefit of U.S. Provisional Application No. 60/283,779 entitled "Real Time Statistical Computation in Embedded Systems" filed on Apr. 12, 2001, the disclosure of which is entirely incorporated herein by reference.

FIELD OF INVENTION

The present subject matter relates to an efficient technique for computing standard deviation (sigma) and variance for a variable, such as a variable parameter measured as part of a closed-loop control operation or a test procedure, and to circuitry and/or programs and processors for implementing that technique.

BACKGROUND

There are many applications today that involve monitoring of a physical process and computing useful statistical information based on sample data obtained from the process monitoring. In a manufacturing process, this may entail sampling a process variable or a performance variable of the manufactured process, for example as each unit produced passes through a particular phase of the production process. In an electrical or mechanical device, this may entail sampling a detectable parameter during device operation, for example as part of a test run immediately following manufacture or during a later re-test. In a disk drive, for example, the drive processor may detect and process a temperature value or a "seek time" required to find an addressed location on the disk. In a tape drive example, the drive processor may monitor a position error signal (PES), the Tracking Servo Error, the Tape Speed Error, under run margin, under run time or ramp distances.

Running control functions often simply determine the difference between a current value of such a measurement and a target or threshold value and adjust the process in question based on the result of that determination. However, there are many testing and manufacturing control techniques that require more complex statistical information.

In many modern processes and devices, it is necessary to control a manufacturing process or other operational process based on a measure of performance over some period of time. For this purpose, the circuitry or processor must process some number of samples and compute a useful measure of performance from the sample population. A large number of such applications call for statistical calculation of sigma ($\sigma$), which is the standard deviation; and other processes utilize the variance, which corresponds to $\sigma^2$. Other performance measures are calculated from $\sigma$ or $\sigma^2$, such as the capability analysis index (Cpk) of a process, which shows whether process data points are within specified limits. The process capability index, Cpk, is a standard measure of process capability over an extended period of time for a process exhibiting statistical control. Cpk is considered to be a reliable indicator of process performance, taking into account process variation and deviation from nominal. A "design of experiment" (DOE) process changes a process variable, and the $\sigma$, the $\sigma^2$, or some related performance measure is calculated during a subsequent process run to determine the process performance.

For example, U.S. Pat. No. 5,956,251 to Atkinson et al. discloses methods for meeting end item/assembly tolerance criteria for large flexible parts, which includes calculation of values of Cpk based on the standard deviation ($\sigma$) of the sample population. U.S. Pat. No. 6,269,326 to Lejeune teaches processing the population of samples for each of a plurality of tests run at different measurement dates, to compute an average or mean of the measurements and a standard deviation of the measurements (sigma) for each test date. Then, for each set of samples and for each test date, the methodology computes a criterion of appreciation (CP), defined as the ratio between a difference of limits and the standard deviation.

In current processing and control techniques, the calculation of $\sigma$ or $\sigma^2$ requires considerable time to accumulate sample data and excessive data storage for the samples, until the $\sigma$ or $\sigma^2$ value(s) can be calculated using an entire sample data population. Even after collecting the entire population, the individual processing of each sample as part of the computation takes considerable time and processor power. More specifically, calculation of $\sigma$ or $\sigma^2$, requires accumulating the entire "population" or sample set and then calculating the mean (sum divided by n, the number of samples). The mean is subtracted from each individual sample data point, and each result is squared. The variance ($\sigma^2$) equals the sum of these squares divided by n−1; and of course, the standard deviation ($\sigma$) equals the square root of the variance.

For an n-sample size, the collection of data can consume a sizable memory and the processing thereof requires considerable time after the data acquisition is completed. As a result, real-time computation of the $\sigma$ or $\sigma^2$ value or of any of the performance measures that may be derived therefrom is not practical.

Hence, a need exists for a particularly efficient technique for computing standard the deviation (sigma) and/or the variance of a variable in real time, for example, for use in a process controller or in a performance measurement application. A related need exists for a processing circuit and/or a programmed general purpose processor for implementing the efficient technique for computing these statistical measures of the variable.

SUMMARY

The inventive concepts meet the above noted needs in the art as they relate to techniques and devices for efficiently calculating standard deviation or variance or the like, for a measured process variable or parameter. For example, the concepts alleviate the need to store all samples in the test population until the end of the test run, substantially reducing the memory requirements. The concepts also provide a simpler calculation at the end of the test run, reducing the processing power and time required. These improvements make it possible to implement the calculation of standard deviation or variance for a measured variable or the like as an imbedded function of a processor or other circuit within a manufactured electromechanical device, such as a tape drive or disk drive.

Hence, one aspect relates to a device for computing a statistical value related to a measured process parameter during ongoing operation of the process. A sampling circuit, responsive to a signal representing the measured process parameter, provides a predetermined number of samples of the measured process parameter in sequence, during operation of the process. The device includes means for generating a representation of the variance of the measured process parameter and/or the standard deviation of the measured process parameter in real-time. The device does not store all of the samples of the measured process parameter until completion of the sampling. In a preferred embodiment, the means generates the representation based on summation of the predetermined number of the samples of the measured process parameter and summation of squares of the predetermined number of the samples of the measured process parameter, while actual sample values are effectively discarded.

A method embodiment in accord with this concept generates a statistical measure of performance, such as variance or standard deviation, from a measured process variable during ongoing operation of a process. This method entails measuring the variable to generate a signal and taking a predetermined number (n) of samples from the signal, during the ongoing operation of the process. Concurrent with the sampling, a running sum of the n samples is accumulated, and a running sum of squares of the n samples is accumulated. Accumulation of these two sums does not require storing all n samples until the end of the method. Typically, the individual samples can be discarded. At the end of the sampling, the method involves processing a final value of the sum of the n samples and a final value of the sum of the squares of the n samples, to produce the statistical measure of performance.

An embodiment of an apparatus for implementing this technique includes a sampler responsive to the signal representing the measured process variable, for sampling the signal during ongoing operation of the process to generate a predetermined number (n) of samples. The apparatus includes two computation modules, which may be implemented in circuitry, but preferably are implemented in code or microcode for execution by a programmable digital processor. An interim computation module accumulates the sum of the n samples, and it accumulates a sum of squares of the n samples, during the ongoing operation of the process, without retaining all of the n samples. A one time computation module, coupled to the interim computation module, computes the statistical measure of performance in response to the final sum of the n samples and the final sum of squares of the n samples.

The preferred embodiment of the interim computation module comprises two accumulator loops and a multiplier. A first accumulator loop receives the n samples and accumulates the sum of the n samples during ongoing operation of the process. The multiplier calculates the square of each of the n samples as received from the sampler, and the second accumulator loop accumulates the sum of the squares of the n samples from the multiplier.

The preferred embodiment of the one time computation module comprises means for receiving the sum of the n samples and the sum of squares of the n samples and in response calculating:

$$\sigma^2 = \frac{1}{n-1}\left(\sum_{i=1}^{n} x_i^2 - n\mu^2\right)$$

where:

$\sigma^2$ is variance, $\mu$ is mean of the n samples of the process variable (sum of sample divided by n); and $x_1$ is sample for ith sampling interval, in range from 1 to n.

In the preferred embodiment, the one time computation module also outputs the mean ($\mu$) and computes the square root of the variance to provide an output of the standard deviation.

A particular advantage of the technique supplemented by the embodiments is that it can be implemented as an embedded function of any manufactured device that contains an appropriate electronic circuit or microprocessor. The manufactured device can include discrete logic circuitry or preferably one or more modules of program code for the processor, to enable the device to automatically calculate the variance and/or the standard deviation and possibly other statistical measures of performance, for example as part of a test run immediately following manufacture or during a later re-test. In a disk drive, for example, the drive processor may detect and process a temperature value or a "seek time" required to find an addressed location on the disk. In a tape drive, the drive processor may monitor a position error signal (PES), the Tracking Servo Error, the Tape Speed Error, under run margin, under run time or ramp distances. In each of these examples, after accumulating the sum and the sum of the squares from the desired number of samples, the imbedded circuit or program functions to perform the one-time calculation(s) and output one or more of the statistical measures of performance.

Additional objects, advantages and novel features of the embodiments will be set forth in part in the description which follows, and in part will become apparent to those skilled in the art upon examination of the following and the accompanying drawings or may be learned by practice of the invention. The objects and advantages of the inventive concepts may be realized and attained by means of the instrumentalities and combinations particularly pointed out in the appended claims.

BRIEF DESCRIPTION OF THE DRAWINGS

The drawing figures depict preferred embodiments by way of example, not by way of limitations. In the figures, like reference numerals refer to the same or similar elements.

FIG. 2 is a flow-chart, essentially in block diagram form, showing the processing elements or steps of the interim (Int) computation module in the embodiment of FIG. 1.

FIG. 3 is a flow-chart, essentially in block diagram form, showing the processing elements or steps of the one time computation module in the embodiment of FIG. 1.

DETAILED DESCRIPTION OF THE PREFERRED EMBODIMENTS

Figure 1:
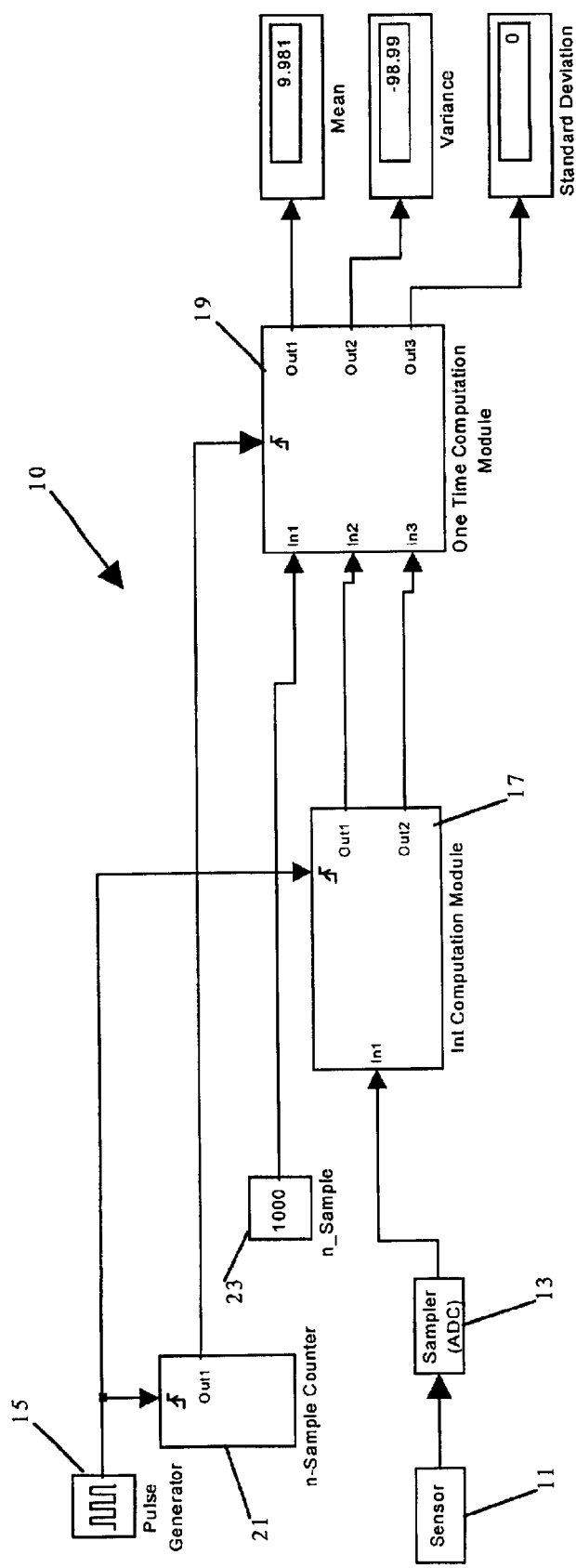
FIG. 1 is a flow-chart, essentially in block diagram form, showing the high level functional elements or steps of an exemplary embodiment.

For various analyses, it is useful to compute the mean of the data, since the mean is the simplest computation of a measure of performance that does not require acquisition of the full set of sample data prior to the calculation. The mean is the sum of all data divided by the total sample size. Hence, a simple algorithm samples the data and accumulates both sample size (count) and the sum of the sample data, and this algorithm can continually calculate the mean by simply dividing current value of the sum by the current vale of the sample size (count). However, the final mean is calculated only when the entire population of sample data is finally accumulated and processed.

Variance is the square of the standard deviation. Computation of the variance requires both the square of the individual sample values and the mean of the process. Since we cannot get the mean until the total sample is collected, the online computation of variance as we acquire samples becomes a non-trivial task, without collecting and later processing the entire set of sample data. Of course, it is desirable to compute both the means and the variance without waiting to complete the collection of the entire set of sample data, since such collection requires a large buffer side for the process and requires delay during accumulation of all of the samples. The inventive approach therefore calculates both the mean and the variance of a given variable, but without having to collect the entire N size set of samples of the data.

Instead of storing the entire set of samples and performing all the calculations of a desired statistical measure of performance from the sample set, the mean (based on a running summation of the samples) and a running summation of squares of the samples are used. Hence, the embodiments disclosed herein relate to a technique for efficient calculation of one or more statistical measures of performance based on samples of a monitored parameter or variable of an ongoing process. The inventive technique involves accumulating running totals of: (1) the samples of the variable and (2) the squares of the samples of the variable. However, it is not necessary to store either the individual samples or the individual squared data points. Essentially both the samples and the squares are discarded. When all the sample values have been taken, and the two summations are complete, simple one-time calculations based on those two summations can quickly and accurately provide the variance and/or the standard deviation. The preferred embodiment also provides a calculation of the mean value. The one time computation can provide any or all of the statistical values without using the individual samples or their individual square values. Other performance measures may be quickly derived from one or more of these three values.

As discussed later, the inventive embodiment relies on a new formulation for calculating variance and/or standard deviation as measure(s) of performance. To understand how this is possible, it may be helpful first to consider the following mathematical derivation.

It is well settled that the standard deviation σ is defined by the following formula:

LIST OF REFERENCE NUMBERALS

| | |
|---|---|
| 100 | laser projector |
| 102 | vertical laser beam |
| 104 | horizontal laser beam |
| 106 | vertical laser beam |
| 108 | collimated laser diode |
| 110 | conductor's baton |
| 200 | tower |
| 202 | mirror |
| 204 | pivot |
| 206 | armature |
| 208 | base |
| 300 | tower |
| 302 | mirror |
| 304 | pivot |
| 306 | armature |
| 308 | base |
| 400 | laser detector |
| 402 | aperture |
| 406 | MIDI connector |
| 410 | power LED |
| 420 | 'laser alignment' LED |
| 430 | 'first beat' LED |

-continued

LIST OF REFERENCE NUMBERALS

| | |
|---|---|
| 450 | mode switch |
| 500 | set of '4/4' gestures |
| 510 | first beat |
| 520 | second beat |
| 530 | third beat |
| 540 | fourth beat |
| 600 | set of '3/4' gestures |
| 610 | first beat |
| 620 | second beat |
| 630 | third beat |
| 700 | optical sensor |
| 702 | one-shot trigger |
| 704 | sequential logic |
| 706 | timer |
| 708 | divider |
| 710 | MIDI Encoder |
| 712 | computer MIDI port |
| 714 | MIDI software player | where n is the number of samples of the variable data x. The value $x_i$ is the sample value of the variable x taken at the ith point in time or sample interval. The expression shown above at (1) is the normal formulation used to calculate the standard deviation.

The mean $\mu$, which is the sum of the sample values divided by the number of samples, can be represented by the following formula.

$$\mu = \frac{\sum_{i=1}^{n} x_i}{n} \quad (2)$$

The variance is essentially the square of the standard deviation ($\sigma$). Hence, applying expression (1), the variance can be expressed as shown below.

$$\sigma^2 = \frac{1}{n-1} \sum_{i=1}^{n} (x_i - \mu)^2 \quad (3)$$

The expression (3) for the variance involves a summation of square terms, where each the terms is the difference between the ith sample ($x_i$) value and the mean ($\mu$). The actual multiplication of the squaring function can be expressed as $(x_i-\mu)*(x_i-\mu)$. When this multiplication is carried out, within the expression (3), the expression for the variance becomes.

$$\sigma^2 = \frac{1}{n-1} \left( \sum_{i=1}^{n} (x_i^2 - 2\mu * x_i + \mu^2) \right). \quad (4)$$

It is then possible to distribute the summation function to all of the terms within the innermost expression.

$$\sigma^2 = \frac{1}{n-1} \left( \sum_{i=1}^{n} x_i^2 - 2\mu \sum_{i=1}^{n} x_i + \sum_{i=1}^{n} \mu^2 \right) \quad (5)$$

However, since the mean ($\mu$) is a constant, the summation of the mean over n sample intervals becomes the product of the mean times the number n of the samples, which stated as an equation, reads:

$$\sum_{i=1}^{n} \mu^2 = n\mu^2. \quad (6)$$

Applying (6), the expression (5) for the variance becomes:

$$\sigma^2 = \frac{1}{n-1}\left(\sum_{i=1}^{n} x_i^2 - 2\mu \sum_{i=1}^{n} x_i + n\mu^2\right). \quad (7)$$

Recall that from expression (2) the mean ($\mu$) equals the sum of the sample data values $x_i$ divided by the number n of samples. From that, we know that we can:

$$\text{replace} \sum_{i=1}^{n} x_i \text{ with } \sum_{i=1}^{n} x_i = n\mu$$

When we make this replacement in the middle term of the expression (7), then the expression for the variance becomes:

$$\sigma^2 = \frac{1}{n-1}\left(\sum_{i=1}^{n} x_i^2 - 2\mu \cdot n \cdot \mu + n\mu^2\right). \quad (8)$$

Then, the expression can be simplified further by performing the multiplication of the $\mu$ terms, so the expression becomes:

$$\sigma^2 = \frac{1}{n-1}\left(\sum_{i=1}^{n} x_i^2 - 2n\mu^2 + n\mu^2\right). \quad (9)$$

Then, the expression can be simplified by combining like terms, so the expression for the variance becomes the result:

$$\sigma^2 = \frac{1}{n-1}\left(\sum_{i=1}^{n} x_i^2 - n\mu^2\right). \quad (10)$$

Unlike the expression (1), the resulting expression (10) can be calculated from data accumulated in real-time, during processing, without storing all of the original sample data. In this expression (10), the n term is a constant, that is to say the desired number of samples. For calculation of the mean ($\mu$), it is necessary to accumulate the total of the sample values, however, this can be done on a running bases during operation of the processes. For the square summation term, it is possible to square each sample value x, when received and add the result to a running total in a summation or accumulation register, during the process operation. When all the samples have been processed, and the totals of these two values (x and $x^2$) have been accumulated, it is only necessary to calculate the mean from expression (2) and perform a one time calculation of the result shown in expression (10) to obtain the variance. A square root calculation will then yield the standard deviation ($\sigma$). Various desired measures of performance, such as Cpk, can be derived from the mean, the variance and/or the standard deviation.

Reference now is made in detail to the presently preferred embodiments for implementing this technique, examples of which are illustrated in the accompanying drawings and discussed below. FIG. 1 is a block diagram of an implementation of the technique outlined above. FIGS. 2 and 3 provide similar diagrams for two of the elements of the embodiment of FIG. 1. The illustrated implementation may utilize discrete logic components, essentially as shown. With the possible exception of the physical sensor and associated sampler circuit, the functional blocks preferably are implemented in code executed by a processor. For example, in a tape drive or a disk drive, most of the elements shown in FIG. 1 may be implemented in microcode run by the drive processor. However, for ease of discussion and understanding, the elements shown will be referred to as elements or modules.

FIG. 1 shows the elements of a circuit 10 for computing the mean ($\mu$), the variance ($\sigma^2$) and the standard deviation ($\sigma$) of a set of samples of a measured process variable. In practice, the circuit 10 will include a sensor 11 or other element for detecting the variable parameter. In a disk drive, for example, the sensor may be a temperature sensor. If the sensor 11 provides an analog signal, then the circuit 10 will include a sampler 13. The sampler may be as simple as an analog to digital converter (ADC), for example if the sensor 11 is an analog temperature sensor. In other applications, the sampler 13 may process one or more measured signals to generate samples of a desired parameter, such as a position error signal (PES), the Tracking Servo Error, the Tape Speed Error, under run margin, under run time or ramp distances. The sensor 11 typically is a hardware element, and the sampler 13 may include some hardware, although in some embodiments some or all of the functions of the sampler may be performed by execution of program code by an appropriate digital processor.

A pulse generator 15 provides clock signals at the desired sampling rate, for example, to the sampler 13 to control the timing and rate of the analog to digital conversion. The pulse generator may be a separate clock circuit but preferably is implemented as an element of the processor controlled by appropriate program code.

The sampler 13 provides a sequence of samples of the sensed variable signal to the input (In1) of an interim computation module 17, at the rate controlled by the sampling clock signal from the pulse generator 15. The module 17 also receives the clock signal from the pulse generator 15. The module 17 is a digital circuit or a process routine in a programmed digital processor for calculating two specific sums in response to the input samples and the sampling clock. In the embodiment, the interim computation module 17 accumulates the two summation values and provides those values at output ports Out1 and Out2. The first output (Out1) is the sum of the input samples. The second output (Out2) is the sum of the squares of the input samples. The interim computation module 17 supplies these two output values to appropriate inputs of a one time computation module 19.

The circuit 10 also includes a counter 21, coupled to the pulse generator, for counting a predetermined number of samples or sampling intervals. Essentially, the counter provides a control signal to the one time computation module 19 when the circuit has received and processed the desired number n of the samples of the variable parameter, to trigger the one-time computation by that module. The module 19 also receives the number n, as a constant value indicating the number of samples (on In1), for example from the circuit 23.

Hence, the one time computation module 19 receives the number n of sample values on its first input (In1), the summation of the n samples on its second input (In2), and the summation of the squares of the samples on its third input (In3). When triggered by the counting of the n samples by the signal from the counter 21, the one time computation module 19 computes the mean as the value of the sum of the samples divided by the number n of the samples, and outputs that value on its first output line (Out1). Concurrently, the one time computation module 19 computes the variance ($\sigma^2$) based on expression (10) above, and it computes the standard deviation ($\sigma$) as the square root of the computed variance.

Hence, the illustrated embodiment of the one time computation module 19 outputs the mean ($\mu$), the variance ($\sigma^2$) and the standard deviation ($\sigma$) immediately following the taking and processing of the last of the n samples. The module 19 could provide these computed statistical values to one or more displays. In an embodiment embedded in a disk or tape drive or other manufactured device with a processor, the processor incorporating the module 19 would output the three statistical values via one or more appropriate data ports.

To insure a full understanding of the embodiment, it may be helpful to consider examples of the interim computation module 17 and the one time computation module 19. FIG. 2 shows a possible embodiment of the interim computation module 17, and FIG. 3 shows a possible embodiment of the one time computation module 19. For convenience, the elements for triggering the operations of these modules, in response to the clock or the counter output, have been omitted, although various means for implementing such timing/control functions should be familiar to those skilled in the art.

As shown in FIG. 2, the samples received on the input (In1) are periodically applied to a first input of an adder 25 of the module 17. The output of the adder 25 is supplied to the input of an accumulator register 27, which provides a delay (1/z) equal to one sampling interval. The register output is fed back to the second input of the adder 25, so that each new sample is added to the output register value (which corresponds to the sum produced in the previous sampling interval). In this manner, the adder 25 and the first register 27 form a first accumulator loop, for processing the sample values. Over a number n of sampling intervals, the register 27 accumulates the total sum of the set of n samples of the input variable and provides this total on the first output line (Out1) of the interim computation module 17.

The samples received on the input (In1) also are periodically applied in parallel to both inputs of a multiplier circuit 29 or other two-input product device. During any given sampling period, the multiplier circuit 29 produces the square of the current sample.

During each interval, the multiplier circuit 29 supplies the square of the current sample to a first input of an adder 31. As the samples are received in sequence, the multiplier circuit 29 sequentially supplies the squares of the samples to this input of the adder 31. The output of the adder 31 is supplied to the input of a second accumulator register 33, which provides a delay (1/z) equal to one sampling interval. The register output is fed back to the second input of the adder 31, so that each new square of a sample is added to the output register value (which corresponds to the sum of squares produced in the previous sampling interval). In this manner, adder 31 and the register 33 form a second accumulator loop, which processes the squares of the samples. Over a number n of sampling intervals, the register 33 accumulates the total sum of the set of n squares of the samples of the input variable, and the register 33 provides this second total on the second output line (Out2) of the interim computation module 17.

The one time computation module 19 (FIG. 3) uses the sum of the samples, which it receives on its second input (In2) to calculate the mean, for example in accord with expression (2). In accord with the embodiment, the one time computation module 19 uses the sum of the samples from its second input (In2) as well as the sum of the squares received on its third input (In3) to calculate the variance, for example in accord with expression (10). In the embodiment, the module 19 computes the standard deviation as the square root of the computed variance.

The computation module 19 is triggered to perform its computations at the end of n sample intervals, that is to say when a complete set of n samples have been taken by the sampler 13 and have been processed by the module 17. As shown in FIG. 3, value n (from input In1) is applied to an inverter 35, which provides a digital value representing 1/n. The value n (from input In1) also is applied to a circuit 37, which provides a digital value representing 1/(n−1). The circuit 37, for example, may comprise a subtraction circuit for calculating 1−n and an inverter for calculating the inverse of the subtraction result.

A multiplier circuit 39 or other two-input product device receives the value of 1/n and multiplies that value by the total sum of the sample values received on the second input (In2) of the module 19. The product output by the circuit 39 is the mean ($\mu$), which is supplied to the first output line (Out1) of computation module 19.

The multiplier circuit 39 also supplies the mean ($\mu$) in parallel to both inputs of a multiplier circuit 41 or other two-input product device. The multiplier circuit 41 therefore produces a product value equal to the square of the mean value or equal to $\mu^2$.

The multiplier circuit 41 supplies the value $\mu^2$ to one input of another multiplier circuit 43 or other two-input product device. On its other input, the multiplier circuit 43 receives the constant value n (from input In1). Hence, the product generated by the multiplier circuit 43 equals $n\mu^2$.

On its positive input, a subtractor 45 receives the sum of the squares of the set of samples from the interim computation module 17, via the third input (In3) of the module 19. The subtractor 45 receives the value of $n\mu^2$ from the multiplier circuit 43 on its negative input. Hence, the subtractor 45 produces a value equal to the difference between the sum of the squares of the samples and $n\mu^2$. This corresponds to the parenthetical portion of expression (10).

The value from the subtractor 45 goes to one input of yet another multiplier circuit 47 or other two-input product device. The multiplier circuit 47 receives the value for 1/(1−n) from the circuit 37. Hence, the multiplier circuit 47 computes the value of the variance ($\sigma^2$) in accord with the expression (10), for output from the second output lead (Out2) of the module 19. An arithmetic logic unit performs the math function 49 for computing the square root of the variance and supplies the resultant value for the standard deviation ($\sigma$) on the third output lead (Out3) of the module 19.

Those skilled in the art will recognize that the present concepts have a broad range of applications, and the embodiments admit of a wide range of modifications, without departure from the inventive concepts. For example, the illustrated embodiment provided the mean, the standard deviation and the variance. It is a simple matter to add further computation modules to process one or more of these statistical values to produce desired measures of performance, such as Cpk.

The embodiments may utilize variable samples taken automatically during operation of a machine, for example a disk drive or tape drive. Alternatively, the inventive technique may utilize variable samples taken by testing or monitoring during a manufacturing process, for example, by sampling the performance of products created by the manufacturing process. In either case, the inventive technique accumulates the necessary sums in real-time during the actual sampling, and without longer term storage of the original sample data. When all samples have been taken, a simple set of one-time calculations provides the mean, the standard deviation and/or the variance. More complex processing of stored individual samples off-line, after completion of the sampling routine, is no longer necessary.

One advantage of the inventive real-time technique is the ability to imbed the calculation into an electronic product, itself. For example, the computation capability may be imbedded in a tape or disk drive. When instructed to perform a test, for example during certification testing immediately following manufacture, the processor of the drive will calculate and output the desired values in real-time, substantially at the end of the time needed to measure the desired number of samples of the test parameter. The data need not be processed off-line by a separate computer.

Figure 4:
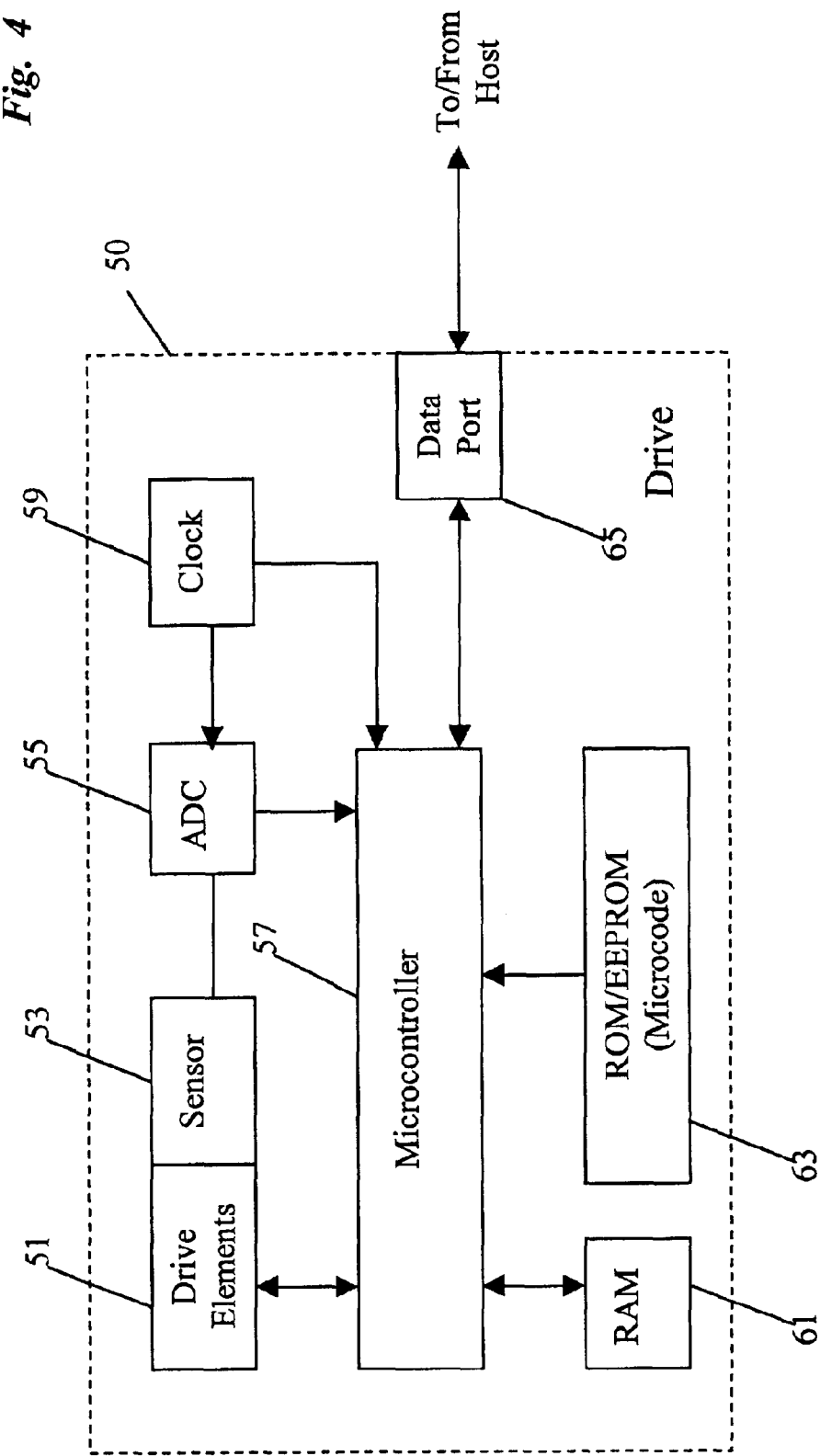
FIG. 4 is a simplified functional block diagram of a data drive, for example a disk drive or a tape drive, having the exemplary embodiment of FIGS. 1–3 embedded therein.

FIG. 4 shows the functional elements of a data device, such as a disk drive or a tape drive. In this example, the device or drive 50 has the exemplary embodiment of FIGS. 1–3 embedded therein.

The drive 50 includes a variety of physical elements 51 for handling the media, such as a tape or disk, and for reading and/or writing data to the media. Among or associated with the drive elements 51, the drive includes one or more sensors 53, for measuring at least one significant parameter during operation of the drive elements. The actual measurement signal from the sensor 53, in this example, is assumed to be an analog signal, although in some devices the signal may be a digital signal. If the sensor 53 provides an analog signal, that signal goes to an analog-to-digital converter (ADC) 55.

The ADC 55 sequentially supplies samples of the measured signal to a micrcontroller 57, at a rate determined by the sampling clock 59. The clock 59 also provides timing signals to the micrcontroller 57. Although shown separately for discussion purposes, the clock 59 may be incorporated into the micrcontroller 57.

The drive also includes a random access memory (RAM) 61 or other dynamic storage device, coupled to the microcontroller 57 for storing information as used and processed by microcontroller 57. The RAM memory 63 also may be used for temporary storage of executable program instructions. The drive 50 further includes a program memory 63, for storing the microcode program for the microcontroller 57. The memory 63 typically comprises read only memory (ROM) and/or electrically erasable read only memory (EEROM). In accord with the inventive embodiments, the microcode stored in the memory 63 includes the programming for the interim computation module 17 and the programming for the one time computation module 19.

In a known manner, the microcontroller 57, itself comprises registers and other components for implementing a central processing unit and possibly an associated arithmetic logic unit. In operation, the accumulations performed in the module 17 may utilize registers in the control processing unit or appropriate sections of RAM memory 63. The microcontroller 57 may be a microprocessor, a digital signal processor or other programmable device, implemented either as a general purpose device or as an application specific integrated circuit (ASIC) chip. Although shown separately, some or all elements of the memories 61, 63 may be incorporated directly within micrcontroller 57.

The central processing unit of the microcontroller 57 executes the microcode for the modules 17 and 19 as well as the sample counter 21 and the constant value (n) input 23, to perform the computations of mean ($\mu$), variance ($\sigma^2$) and standard deviation ($\sigma$), exactly as described above relative to FIGS. 1–3. The microcontroller 57 outputs these statistical measures of the performance of the drive 50 via a data port 65, which may be the same port through which it outputs and receives normal data going to or from the medium. Alternatively, the microcontroller 57 may output the statistical measures of drive performance via one or more separate test data ports. The measures of performance typically go to a test computer or the like, for display and/or further processing. If the drive is already installed at the time of the test, the various results would go to the host computer for display and/or further processing As shown by the discussion above, the embodiments may be implemented using discrete logic circuits. Preferably, embodiments may be formed by appropriately programming a processor or microcontroller to process the measured parameter samples as taught above. Hence, some embodiments of invention encompass programmed processors for implementing the statistical computations in the inventive manner. Other embodiments of invention encompass a software product in the form of at least one machine-readable medium and one or more modules of code carried by the medium that are executable by a processor to cause the processor to compute one or more statistical measures of performance in essentially the manner performed in the embodiments discussed and illustrated herein.

A machine-readable medium, as used herein, may be any physical element or carrier wave, which can bear instructions or code for performing a sequence of steps in a machine-readable form or associated data. Examples of physical forms of such media include floppy disks, flexible disks, hard disks, magnetic tape, any other magnetic medium, a CD-ROM, any other optical medium, a RAM, a ROM, a PROM, an EPROM, a FLASH-EPROM, any other memory chip or cartridge, as well as media bearing the software in a scannable format. A carrier wave type of medium is any type of signal that may carry digital information representative of the data or the instructions or code for performing the sequence of steps. Such a carrier wave may be received via a wireline or fiber-optic network, via a modem, or as a radio-frequency or infrared signal, or any other type of signal which a computer or the like may receive and decode.

While the foregoing has described what are considered to be the best mode and/or other preferred embodiments, it is understood that various modifications may be made therein and that the invention or inventions disclosed herein may be implemented in various forms and embodiments, and that they may be applied in numerous applications, only some of which have been described herein. It is intended by the following claims to claim any and all modifications and variations that fall within the true scope of the inventive concepts.

What is claimed is:

1. A method of generating a statistical measure of performance from a measured process variable during ongoing operation of a process, comprising:
   a) measuring the variable to generate a signal during the ongoing operation of the process;
   b) taking a predetermined number (n) of samples from the signal during the ongoing operation of the process;
   c) during the sampling, accumulating a running sum of the n samples, and accumulating a running sum of squares of the n samples, without storing all n samples; and d) processing a final value of the sum of the n samples and a final value of the sum of the squares of the n samples upon completion of the sampling, to produce the statistical measure of performance.

2. A method as in claim 1, wherein the statistical measure of performance comprises variance of the measured process variable.

3. A method as in claim 2, wherein the processing step comprises:
computing a mean from the final value of the sum of the n samples;
computing a difference between the mean and the final value of the sum of the squares of the n samples; and
dividing said difference by n−1.

4. A method as in claim 1, wherein the statistical measure of performance comprises standard deviation of the measured process variable.

5. A method as in claim 4, wherein the processing step comprises:
computing a mean from the final value of the sum of the n samples;
computing a difference between the mean and the final value of the sum of the squares of the n samples;
dividing said difference by n−1; and
computing square root of a result of the dividing step.

6. A method as in claim 1, wherein the statistical measure of performance comprises variance of the measured process variable, and the method further comprises processing the variance to determine standard deviation of the measured process variable.

7. A method as in claim 6, further comprising dividing the final value of the sum of the n samples by n to produce a mean value, at the end of the sampling.

8. A statistical value computation apparatus, for generating a statistical measure of performance from a signal representing a process variable measured during ongoing operation of a process:
a sampler responsive to the signal representing the measured process variable, for sampling the signal during ongoing operation of the process to generate a predetermined number (n) of samples;
an interim computation module coupled to the sampler, for accumulating a sum of the n samples during ongoing operation of the process, and for accumulating a sum of squares of the n samples during ongoing operation of the process, without retaining all of the n samples; and
a one time computation module, coupled to the interim computation module, for computing the statistical measure of performance in response to the sum of the n samples and the sum of squares of the n samples upon completion of the sampling.

9. An apparatus as in claim 8, wherein the interim computation module comprises:
a first accumulator loop receiving the n samples, for accumulating the sum of the n samples during ongoing operation of the process;
a multiplier for squaring each of the n samples as received from the sampler; and
a second accumulator loop coupled to an output of the multiplier for accumulating the sum of squares of the n samples during ongoing operation of the process.

10. An apparatus as in claim 9, wherein each of the accumulator loops comprises an adder, a register and a feedback from an output of the register to one input of the adder.

11. An apparatus as in claim 8, wherein the one time computation module comprises means for receiving the sum of the n samples and the sum of squares of then samples and in response calculating:

$$\sigma^2 = \frac{1}{n-1}\left(\sum_{i=1}^{n} x_i^2 - n\mu^2\right)$$

where:
$\sigma^2$ is variance,
$\mu$ is mean of the n samples of the process variable; and
$x_i$ is sample value taken in an ith sampling interval, in range from 1 to n.

12. An apparatus as in claim 11, wherein the one time computation module further comprises means for outputting the mean ($\mu$) of the n samples of the process variable.

13. An apparatus as in claim 11, wherein the one time computation module further comprises means for taking a square root of the variance, to provide a standard deviation ($\sigma$) of the n samples of the process variable.

14. An apparatus as in claim 8, wherein the interim computation module and the one time computation module comprise microcode modules for execution by a programmed digital processor.

15. An apparatus as in claim 14, further comprising a machine-readable medium, wherein the microcode modules are stored on the machine-readable medium.

16. An apparatus as in claim 15, further comprising a processor for executing the microcode modules.

17. A device for computing a statistical value related to a measured process parameter during ongoing operation of the process, the device comprising:
a sampler responsive to a signal representing the measured process parameter for providing a predetermined number of samples of the measured process parameter in sequence, during operation of the process; and
means for generating and outputting a representation of at least one of variance of the measured process parameter and standard deviation of the measured process parameter in real-time upon completion of the sampling, without retaining all of the predetermined number of the samples of the measured process parameter.

18. A device as in claim 17, wherein the means for generating are for generating the representation based on summation of the predetermined number of the samples of the measured process parameter and summation of squares of the predetermined number of the samples of the measured process parameter.

* * * * *

UNITED STATES PATENT AND TRADEMARK OFFICE
CERTIFICATE OF CORRECTION

PATENT NO. : 6,785,632 B1
DATED : August 31, 2004
INVENTOR(S) : Goker, Turguy

It is certified that error appears in the above-identified patent and that said Letters Patent is hereby corrected as shown below:

<u>Title page,</u>
Item [73], Assignee, change "Seagate Removable Solutions LLC, Scotts Valley, CA (US)" to -- Seagate Removable Storage Solutions LLC, Scotts Valley, CA (US) --

Signed and Sealed this

Fifth Day of July, 2005

JON W. DUDAS
*Director of the United States Patent and Trademark Office*